United States Patent
Wiest et al.

(10) Patent No.: US 8,267,365 B2
(45) Date of Patent: Sep. 18, 2012

(54) APPARATUS FOR SECURING A MEASURING OR DISPLAY UNIT ON AN OBJECT

(75) Inventors: Achim Wiest, Weil am Rhein (DE); Andreas Berger, Reinach (CH); Quirin Müller, Muttenz (CH)

(73) Assignee: Endress + Hauser Flowtec AG, Kagenstrasse, Reinach (CH)

( * ) Notice: Subject to any disclaimer, the term of this patent is extended or adjusted under 35 U.S.C. 154(b) by 121 days.

(21) Appl. No.: 12/451,077

(22) PCT Filed: Apr. 23, 2008

(86) PCT No.: PCT/EP2008/054881
§ 371 (c)(1),
(2), (4) Date: Mar. 29, 2010

(87) PCT Pub. No.: WO2008/129049
PCT Pub. Date: Oct. 30, 2008

(65) Prior Publication Data
US 2010/0187392 A1      Jul. 29, 2010

(30) Foreign Application Priority Data
Apr. 24, 2007   (DE) .......................... 10 2007 019 610

(51) Int. Cl.
A47B 96/06   (2006.01)
E04G 3/00    (2006.01)
F16B 1/00    (2006.01)
G09F 7/18    (2006.01)

(52) U.S. Cl. ..... 248/230.1; 248/49; 248/65; 248/226.11

(58) Field of Classification Search ................ 248/65, 248/49, 226.11, 230.1, 230.5, 121, 125.1
See application file for complete search history.

(56) References Cited

U.S. PATENT DOCUMENTS

| | | | | |
|---|---|---|---|---|
| 1,075,064 A * | 10/1913 | Prime | ............ | 83/535 |
| 2,535,563 A * | 12/1950 | Boyer et al. | ................ | 248/506 |
| 4,827,272 A * | 5/1989 | Davis | ........... | 343/702 |
| 5,312,094 A * | 5/1994 | Zera | ................ | 269/3 |
| 5,497,968 A | 3/1996 | Hewko | | |

(Continued)

FOREIGN PATENT DOCUMENTS
CH          285552          12/1950
(Continued)

OTHER PUBLICATIONS

Newport Optics and Mechanics 1999/2000 Catalog, pp. 13-54 and 22-37.

*Primary Examiner* — Amy J Sterling
(74) *Attorney, Agent, or Firm* — Bacon & Thomas, PLLC

(57) ABSTRACT

An apparatus for securing a measuring or display unit on an object. Included is elongated guide element, on which an orientation aid and a holder for the measuring unit or for the display unit are arranged shiftably in the longitudinal direction of the guide element, wherein the orientation aid and the holder are so positionable relative to one another, that the object is held clamped between the orientation aid and the holder or a mounted sensor, and wherein a resilient tensioning apparatus is provided, with which the measuring or display unit is pressable with a defined clamping force onto the object.

9 Claims, 4 Drawing Sheets

U.S. PATENT DOCUMENTS

| | | | |
|---|---|---|---|
| 5,653,720 A * | 8/1997 | Johnson et al. | 606/151 |
| 5,984,934 A * | 11/1999 | Ashby et al. | 606/151 |
| 6,315,182 B1 | 11/2001 | Chen | |
| 6,802,848 B2 * | 10/2004 | Anderson et al. | 606/157 |
| 8,047,081 B2 * | 11/2011 | Berberig et al. | 73/861.25 |
| 8,096,515 B2 * | 1/2012 | Locke et al. | 248/214 |

FOREIGN PATENT DOCUMENTS

| | | |
|---|---|---|
| DD | 833 244 | 3/1952 |
| DD | 239 352 | 9/1986 |
| DE | 29 27 684 | 1/1980 |
| DE | 103 59 031 | 7/2005 |
| DE | 10 2004 052 489 | 5/2006 |
| DE | 10 2005 052 550 | 2/2007 |
| EP | 0 974 815 | 1/2000 |
| GB | 826 789 | 1/1960 |
| GB | 2 286 987 | 9/1995 |

\* cited by examiner

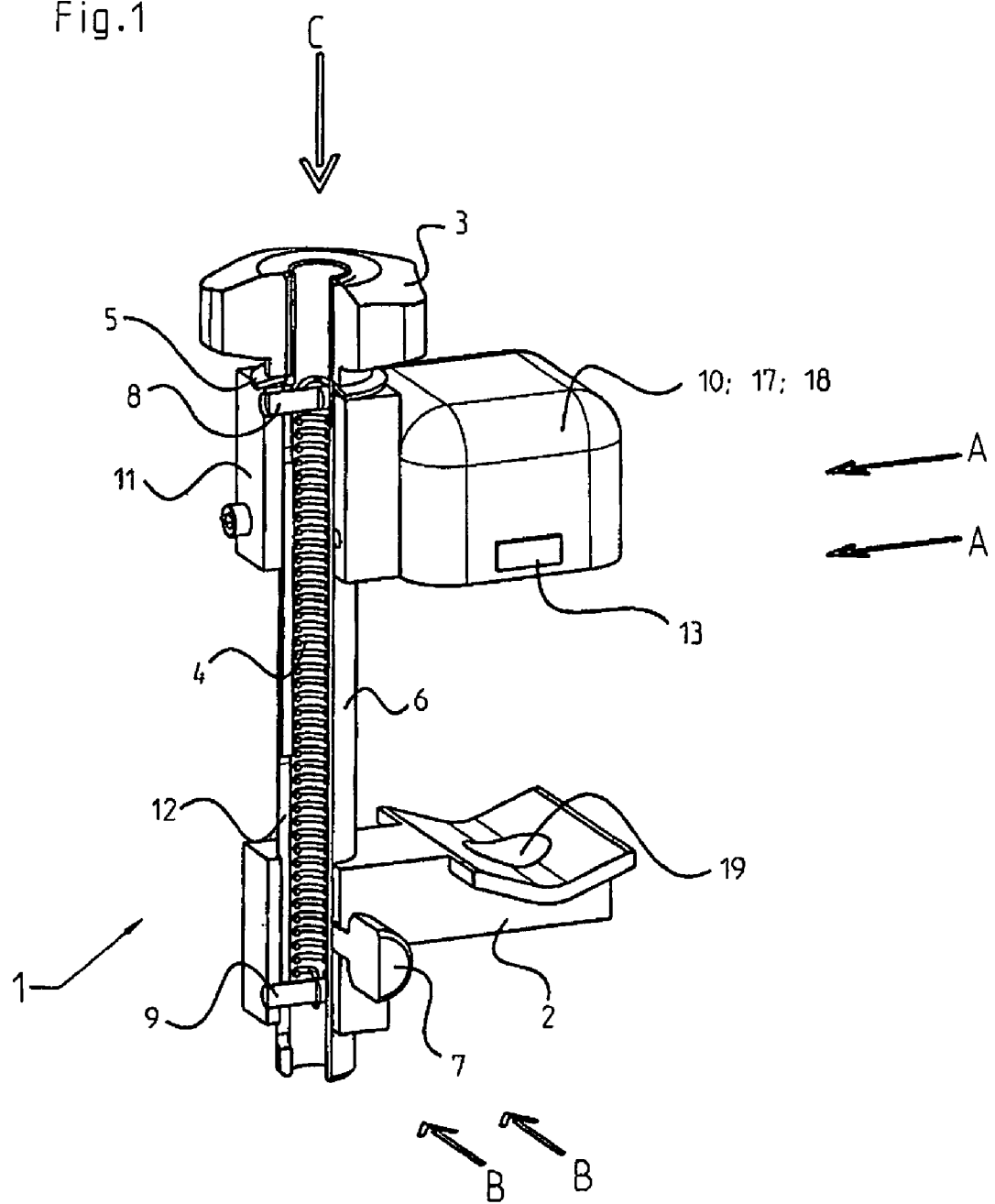

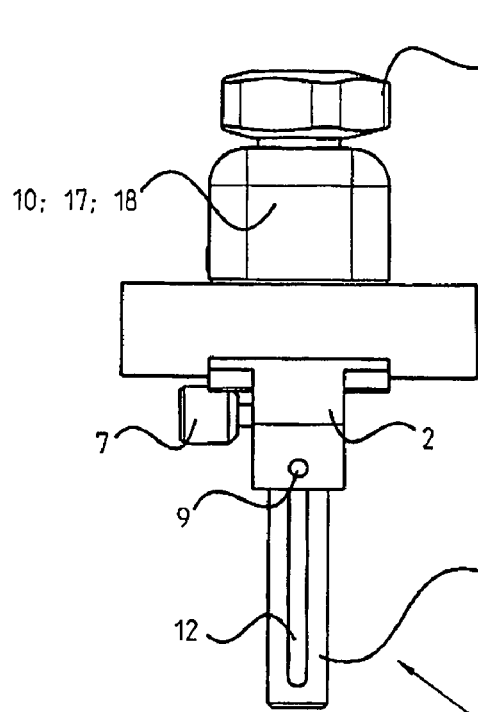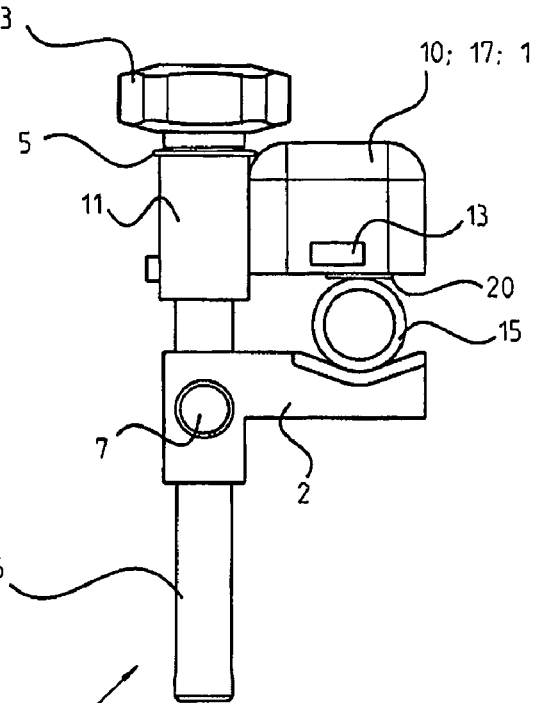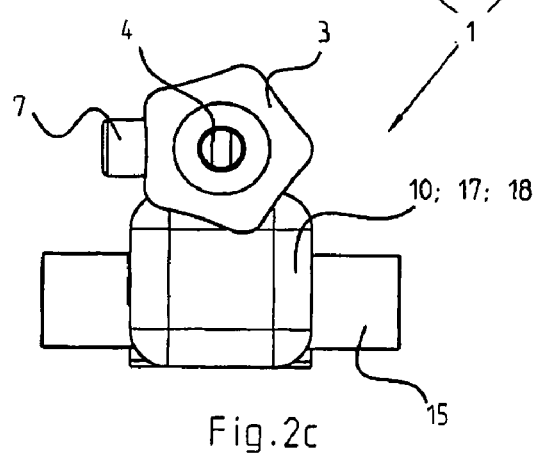

APPARATUS FOR SECURING A MEASURING OR DISPLAY UNIT ON AN OBJECT

TECHNICAL FIELD

The invention relates to an apparatus for securing a measuring or display unit on an object. The measuring unit is, for example, a pressure or temperature sensor, an ultrasonic sensor or a clamp-on flow measuring device, e.g. in the form of a so-called flow box.

BACKGROUND DISCUSSION

Clamp-on ultrasonic flow measuring devices are often applied in process and automation technology. They permit volume and/or mass flow of a medium in a pipeline to be determined contactlessly, since they are placed externally on the pipeline. Clamp-on ultrasonic flow measuring devices are described, for example, in European Patent EP 0 686 255 B1, U.S. Pat. No. 4,484,478 or U.S. Pat. No. 4,598,593. Usually, the ultrasonic sensors are secured individually with bands onto the pipeline, in which the flow is to be ascertained.

Ultrasonic flow measuring devices available from Endress+Hauser work according to the travel-time difference principle. In the travel-time difference principle, the different travel times of ultrasonic measurement signals in, and opposite to, the flow direction of the medium are evaluated. For this, the ultrasonic measuring signals of the ultrasonic sensors are alternately transmitted or received in the flow direction and counter to the flow direction of the medium. On the basis of the travel-time difference of the ultrasonic measuring signals, the flow velocity and therewith, in the case of known diameter of the tube, the volume flow, e.g. volume flow rate, or in the case of known density of the medium, the mass flow, can be determined.

In the case of clamp-on ultrasonic flow measuring devices, which work according to the travel-time difference principle, the ultrasonic measuring signals are radiated at a predetermined angle into the pipeline, in which the medium is located. In order that as large a part as possible of the energy radiated by an ultrasonic transducer into the containment be received by the other ultrasonic sensor, the two ultrasonic sensors must have a defined separation from one another. The particular positions of the ultrasonic sensors on the pipeline depend on the inner diameter of the pipeline and on the velocity of sound in the medium. As other application parameters, which occasionally lead to relatively large measurement errors, the wall thickness of the pipeline and the velocity of sound in the material of the pipeline can be named.

Added to this is the fact that known clamp-on ultrasonic flow measuring devices cannot be mounted on a pipeline without additional mounting aids, e.g. a screw driver. Furthermore, as already stated, the positioning and subsequent affixing of the ultrasonic sensors in the optimal in/out coupling regions is quite problematic.

SUMMARY OF THE INVENTION

An object of the invention is to provide an apparatus, which significantly simplifies the mounting of a clamp-on flow measuring device on a pipeline.

The object is achieved by the features that an elongated guide element is provided, on which an orientation aid and a holder for the measuring and/or display unit are arranged shiftably in the longitudinal direction of the guide element, that the orientation aid and the holder are so positionable relative to one another, that the object is held clamped between the orientation aid and the holder, and that a resilient tensioning apparatus is provided, with which the measuring or display unit is pressable with a defined clamping force against the object. The orientation aid is preferably a prism, which lies against the pipeline in the region of two contact lines lying symmetrically relative to one another and extending parallel to the longitudinal axis of the pipeline. By the predetermined orientation and the centering of the holding apparatus by means of the orientation aid, the holding apparatus is only still rotatable around the longitudinal axis of the pipeline. The two remaining degrees of freedom are defined predeterminedly. Advantageously, moreover, the weight distribution is balanced also in the case of pipelines of smaller nominal diameter. Also, instable pipelines are not deformed by the securement of the apparatus of the invention on the pipeline.

As noted above, the measuring unit is preferably a flow box having at least two ultrasonic sensors, which determine the flow of a medium through a pipeline according to the travel-time difference principle. Of course, the ultrasonic sensor can also be an ultrasonic sensor ascertaining flow via the Doppler principle. In the first case, the two ultrasonic sensors are positionable in such a manner relative to one another, that always a maximum fraction of the ultrasonic measuring signal, which is transmitted from the one ultrasonic sensor, is received in the second ultrasonic sensor. Of course, it is also possible to associate an affixing system of the invention with each of the at least two ultrasonic sensors.

Due to the simple positioning of the ultrasonic sensors always parallel to the longitudinal axis of the pipeline, it is, according to invention, for this only necessary to shift the ultrasonic sensors, as required, along their straight connecting line. Due to the simple releasing and securing of the affixing apparatus on the pipeline without additional aid, the positionally accurate mounting can be significantly simplified.

Especially, the apparatus of the invention is best suitable for securing a measuring and/or display unit on pipelines of small nominal diameter. Due to a set, defined clamping force between orientation aid and holder for the measuring or display unit, deformation of the pipeline can be effectively prevented. Due to the resilient seating, it is, moreover, even under changing environmental conditions, especially under changing temperature conditions, always assured, that the clamping force is essentially constant. In the coupling of an ultrasonic sensor or a plurality of ultrasonic sensors on a pipeline, this is indispensable for good measuring performance.

Usually, in the case of ultrasonic sensors, which are mounted externally on a pipeline, a coupling layer, e.g. a coupling mat, is provided between the bearing surface of the ultrasonic sensor and the pipeline. This coupling layer serves to keep the reflected portion of the measuring signals as small as possible, so that a large part of the measuring signals is coupled into the pipeline and into the medium. Since the properties of the coupling layer can change as a function of the pressure exerted on it, it is also here of large importance, that the clamping force, or the clamping pressure, remains essentially constant. In other words, the holder of the invention is distinguished by constant pressure exerted on contact surfaces.

In a preferred embodiment of the apparatus of the invention, the guide element is a hollow spindle. Furthermore, it is provided, that there is arranged in the hollow spindle a tension spring, which is affixed, or affixable, at an upper region by a first retaining element and at a lower region by a second retaining element. The retaining element is, in the simplest case, a pin.

Moreover, it is provided, that the upper pin is rigidly connected with the holder and is placed at a fixed position on the guide element. The lower pin is rigidly connected with the orientation aid and is guided in an elongated cavity on the surface of the guide element and, thus, seated shiftably axially relative to the guide element in defined limits. The cavity, which is preferably an elongated hole, is oriented, for this purpose, in the direction of the longitudinal axis of the guide element.

Furthermore, it is provided, that the lower pin is positionable via an affixing unit in a fixed position in the elongated cavity. Preferably, the affixing unit is a knurled screw or a pressure pin.

Furthermore, according to an advantageous embodiment of the apparatus of the invention, it is provided, that the resilient tensioning apparatus is composed of a rotary knob and a spring element; the two are arranged at an upper region of the guide element, or the hollow spindle.

A preferred alternative provides that the resilient tensioning apparatus is a rapid clamping closure, which is operated by throwing a lever.

As already earlier mentioned, the measuring unit is an ultrasonic sensor or a so-called flow box, in which at least two ultrasonic sensors are arranged.

BRIEF DESCRIPTION OF THE DRAWINGS

The invention will now be explained in greater detail on the basis of the drawing, the figures of which show as follows:

FIG. 1 is a first embodiment of the apparatus of the invention in perspective view, including a partial quarter section in the region of the hollow spindle;

FIG. 2a is a view from the direction A A in FIG. 1,

FIG. 2b is a view from the direction B B in FIG. 1,

FIG. 2c is a view from the direction C in FIG. 1;

DETAILED DISCUSSION IN CONJUNCTION WITH THE DRAWINGS

Figure 3:
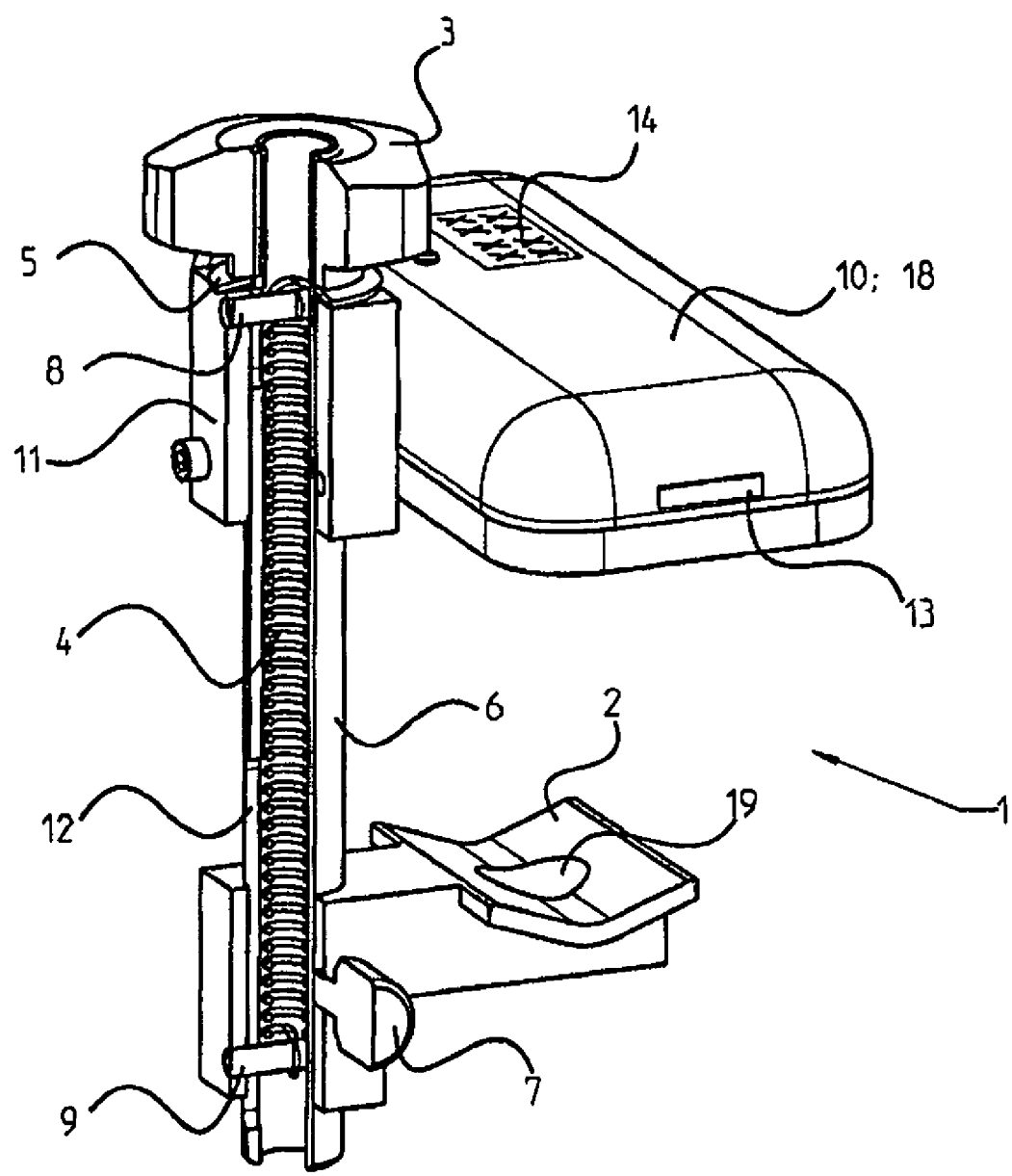
FIG. 3 is a second embodiment of the apparatus of the invention with stretched tension spring and flow box.

FIG. 1 shows a first embodiment of the apparatus of the invention in perspective view, including a partial, quarter section in the region of the guide element 6. In supplementation, FIGS. 2a, 2b, 2c provide different views of the embodiment illustrated in FIG. 1. Thus, FIG. 2a shows a view from the direction A A in FIG. 1, FIG. 2b shows a view from the direction B B in FIG. 1, and in FIG. 2c is a view from the direction C in FIG. 1.

The securement apparatus 1 of the invention is composed of a guide element 6 (here, a hollow spindle 6, in which a spring element 4 is arranged), a sensor holder 11, an orientation aid 2, a knurled screw 7 and a rotary knob 3. The spring element 4 is embodied as a tension spring, which is affixed, or affixable, at defined positions in the two end regions by pins 8, 9. The pins 8, 9 have a double function: They serve, on the one hand, as holding, or retaining, pins for the spring element 4, and, on the other hand, for positioning the orientation aid 2 and the holder 11, so that always the correct positioning of the orientation aid 2 relative to the sensor holder 11 is provided. In the illustrated case, the orientation aid 2 is a prism. The orientation aid 2 can, however, also be a chamfered pin, an angle piece, a notch or a bore.

The lower pin 9 is fixedly connected with the prism 2 and guided in a guide gap 12, here an elongated hole, which is located in the outer wall of the hollow spindle 6. In this way, the desired orientation of the prism, or the orientation aid 2 for sensor holder 11, or for sensor 10, 17, 18, is assured in each position.

For mounting the apparatus of the invention 1, the following procedure is performed:

The knurled screw 7 is released, and the prism 2 and the sensor holder 11 are removed sufficiently from one another, that the pipeline 15 can be positioned between the prism 2 and the sensor holder 11. If, after securement of the holding apparatus 11 on the pipeline 15, no expanding force is exerted on the spring element 4, then the pipeline 15 is held clamped between the prism 2 and the sensor holder 11, or the sensor 10, 17, 18. Necessarily, in the case of pipelines 15 with large outer diameter, in this way, a higher clamping pressure is reached than in the case of pipelines 15 with small outer diameter. Known securement apparatuses, e.g. screw clamps, exhibit an opposite behavior.

Then, the tension spring 4 is fixed in this position by means of the knurled screw 7. In the case of pipelines 15, which are manufactured of a material, wherein no deformation of the tube, or pipe, wall is to be expected, then the affixing apparatus 1 of the invention is tensioned with the rotary knob 3. In the rotary knob 3, a Belleville spring 5 is arranged, which cares therefor, that in the face of temperature fluctuations, which can affect the diameter of the pipeline 15, the originally set clamping pressure remains unchanged. This is especially important in the case of the mounting of an ultrasonic sensor 17 or the flow box 18 on a pipeline, since only so is it assured, that the sensor 17 not subsequently move out of its defined position. The tension spring 4 itself, which is seated in the hollow spindle 6, is only a mounting aid, which permits the sensor 17 to be tightened rapidly and without additional aid in a coarse position on the pipeline 15. Tension spring 4 is not absolutely required for the invention, however. It is also possible to clamp the holding apparatus 1 by means of screws on the pipeline 15. The Belleville spring 5 cares therefor, that in the case of temperature changes, the clamping force of the holding apparatus 1 remains unchanged. This is important, since only so is it assured, that the sensor 17, after mounting, no longer shifts. In the case of very sensitive pipes or a temporary mounting of the sensor, even the clamping force of the tension spring can suffice, so that the Belleville spring is not necessarily required.

An essential advantage of the apparatus of the invention 1 is that it can be mounted on the pipeline 15 with the desired clamping pressure with only one clamping element. Tools are not necessarily required for mounting of the holding apparatus. The mounting can, thus, take place rapidly, safely and simply. On occasion, especially in the case of steel pipes, a coupling mat 20, or a coupling element, is arranged between the sensor 17 and the pipeline 15. In the case of an ultrasonic sensor 17, this assures that a highest possible fraction of the transmitted and/or received signals passes through the interface between sensor 17 and pipeline 15. Since the coupling behavior of the coupling medium 20 can be pressure dependent, the maintaining of a constant clamping pressure in the face of changing environmental, and, here especially temperature, conditions, is of large importance. According to the above discussion, it is, thus, clear that it is possible with the apparatus of the invention, without problem, to insert between sensor 17 and pipeline, on occasion, a coupling mat 20. This makes sense, for example, in the case where the pipeline 15 is of steel.

Due to the resilient mounting of the holding apparatus 1 of the invention on the pipeline 15, an increase of the diameter of the pipeline 15 caused by temperature changes does not lead to a deformation of the pipeline; on the other hand, a desired and once set clamping pressure does not change much, when the diameter of the pipeline 15 lessens due to a temperature change. The obtaining of a desired clamping force and the maintaining of a desired positioning are, thus, secured.

FIG. 3 shows a second embodiment of the apparatus of the invention. In place of a single sensor 17 or a display unit, here a so-called flow box 18 is mounted on the pipeline 15. In a patent application of the applicant or assignee filed simultaneously with the present application, this flow box is described in detail. The disclosure of this parallel patent application is incorporated by reference into the disclosure of the present patent application. In the flow box 18, at least two ultrasonic sensors 17 are arranged, which ascertain the flow of a medium through a pipeline 15 via the travel-time difference principle. On the flow box 18 are located in the illustrated version a display 14 and an interface 13 for data exchange with e.g. a remote, superordinated, control location (not separately illustrated in FIG. 3). The communication can occur wirelessly, e.g. via radio, or optically or via cable.

Figure 4:
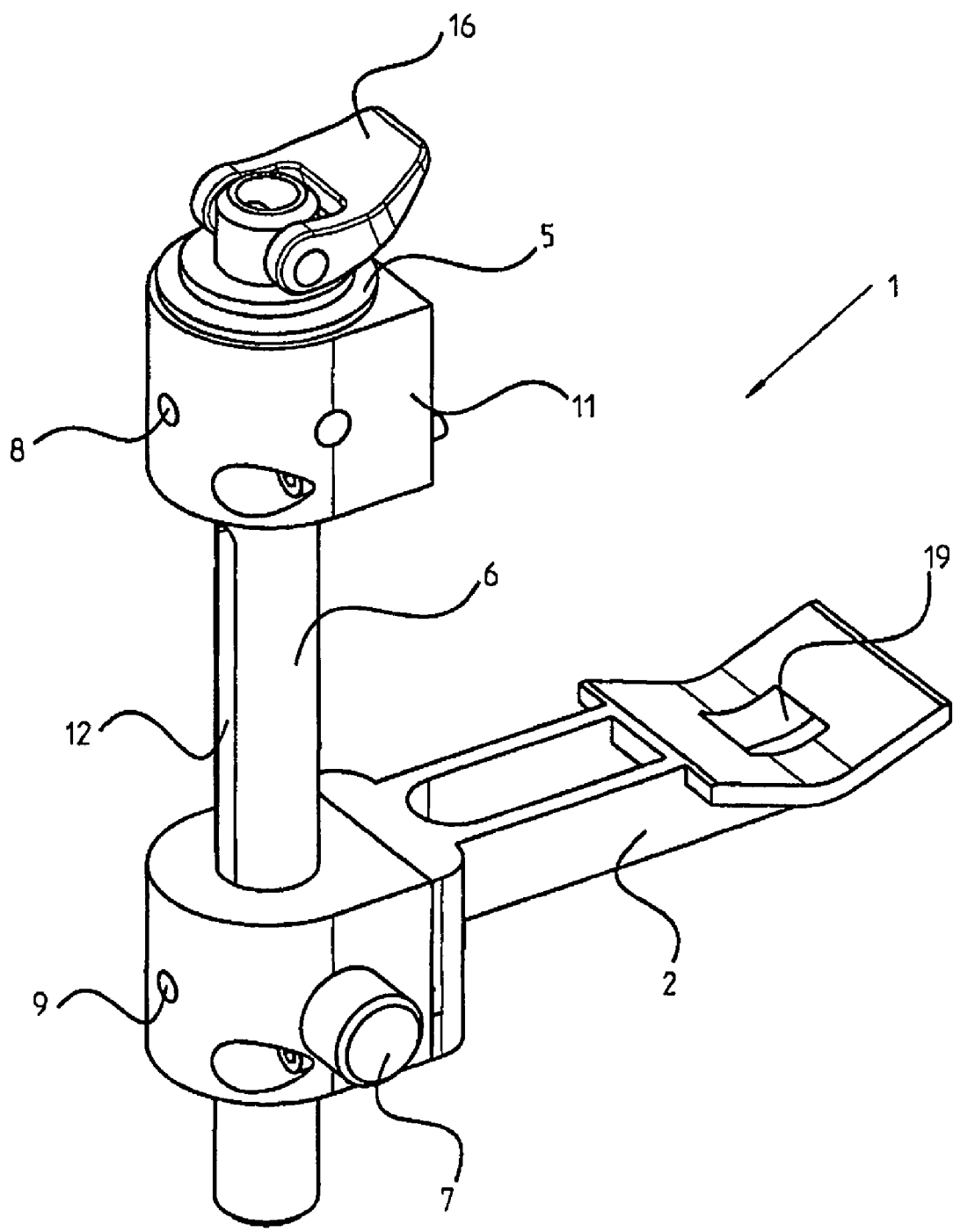
FIG. 4 is a third embodiment of the apparatus of the invention without sensor and without prism, or without orientation aid.

FIG. 4 shows another variant of the apparatus of the invention 1. The essential difference compared to the two earlier described versions is that, here, for the purpose of fine mounting, instead of the Belleville spring 3 and the rotary knob 5, a rapid clamping closure 16 is applied for clamping on the apparatus of the invention on the pipeline 15. Such rapid clamping closures are applied, for example, for the mounting of wheels on bicycles.

1 apparatus of the invention
2 orientation aid/prism
3 rotary knob
4 spring element/tension spring
5 spring element/Belleville spring
6 guide element/hollow spindle
7 knurled screw
8 first retaining element/upper pin
9 second retaining element/lower pin
10 measuring unit/display unit
11 holder for measuring or display unit/sensor holder
12 guide gap/elongated cavity/elongated hole
13 interface for data communication
14 display
15 pipeline
16 rapid clamping closure
17 ultrasonic sensor
18 flow box
19 additional sensor installation point
20 coupling medium, here as coupling mat

The invention claimed is:

1. An apparatus for securement, or for oriented securement, of a measuring or display unit on an object, comprising:
an elongated guide element, on which an orientation aid and a holder for the measuring unit or for the display unit are arranged shiftably in the longitudinal direction of said elongated guide element; and
a resilient tensioning apparatus is provided, with which the measuring or display unit is pressable with a defined clamping force onto the object, wherein
said orientation aid and said holder are so positionable relative to one another, that the object is held clamped between said orientation aid and said holder;
said guide element is a hollow spindle; and
in said hollow spindle, a tension spring is arranged, which is affixed, or affixable, at an upper region of said elongated guide element by a first retaining element and at a lower region of said elongated guide element by a second retaining element.

2. The apparatus as claimed in claim 1, wherein:
said first retaining element comprises an upper pin connected rigidly with said holder and is guided in a gap in said elongated guide element, or in the hollow spindle.

3. The apparatus as claimed in claim 1, wherein:
said second retaining element comprises a lower pin connected rigidly with said orientation aid; and
said lower pin is guided in an elongated cavity, which is oriented in the direction of the longitudinal axis of said elongated guide element.

4. The apparatus as claimed in claim 3, wherein:
said lower pin is affixable via an affixing unit in a defined position with respect to said elongated cavity.

5. The apparatus as claimed in claim 4, wherein:
said affixing unit is a knurled screw or a pressure pin.

6. The apparatus as claimed in claim 1, wherein:
said resilient tensioning apparatus comprises or rotary knob and a spring element, which are arranged at an upper region of said elongated guide element, or the hollow spindle.

7. The apparatus as claimed in claim 1, wherein:
said resilient tensioning apparatus is a rapid clamping closure.

8. The apparatus as claimed in claim 1, wherein:
said measuring unit is an ultrasonic sensor.

9. The apparatus as claimed in claim 1, wherein:
said measuring unit is a flow box, in which at least two ultrasonic sensors are arranged.

* * * * *